US009043960B2

(12) United States Patent
Ballard

(10) Patent No.: US 9,043,960 B2
(45) Date of Patent: Jun. 2, 2015

(54) LANDSCAPE EDGING CONNECTOR

(71) Applicant: Jeffrey Ballard, Granger, IN (US)

(72) Inventor: Jeffrey Ballard, Granger, IN (US)

(*) Notice: Subject to any disclaimer, the term of this patent is extended or adjusted under 35 U.S.C. 154(b) by 0 days.

(21) Appl. No.: 14/098,936

(22) Filed: Dec. 6, 2013

(65) Prior Publication Data

US 2014/0169864 A1 Jun. 19, 2014

Related U.S. Application Data

(60) Provisional application No. 61/737,398, filed on Dec. 14, 2012.

(51) Int. Cl.
*A01G 1/08* (2006.01)

(52) U.S. Cl.
CPC ............. *A01G 1/08* (2013.01); *Y10T 29/49947* (2015.01); *Y10T 403/51* (2015.01); *Y10T 29/49826* (2015.01)

(58) Field of Classification Search
USPC ..................... 256/1, 19; 47/33; 403/292, 293
See application file for complete search history.

(56) References Cited

U.S. PATENT DOCUMENTS

| | | | |
|---|---|---|---|
| 2,809,809 A | 10/1957 | Johnston | |
| 3,933,311 A * | 1/1976 | Lemelson | 47/33 |
| D282,813 S * | 3/1986 | Tappan et al. | D8/1 |
| 4,644,685 A * | 2/1987 | Tisbo et al. | 47/33 |
| 4,702,034 A * | 10/1987 | Ferguson et al. | 47/33 |
| 4,761,923 A * | 9/1988 | Reum et al. | 52/102 |
| 4,831,776 A * | 5/1989 | Fritch | 47/33 |
| 5,301,461 A | 4/1994 | Zwier | |
| 5,379,546 A | 1/1995 | Popp | |
| 5,720,128 A | 2/1998 | Smith et al. | |
| 6,336,290 B1 | 1/2002 | Callan | |
| 6,379,078 B1 | 4/2002 | Zwier | |
| 6,418,675 B1 | 7/2002 | Peggs et al. | |
| 6,460,298 B1 | 10/2002 | Elias | |
| 6,523,300 B2 | 2/2003 | Smith | |
| 6,619,565 B1 | 9/2003 | Abbott | |
| 6,625,925 B1 | 9/2003 | Foster | |
| 6,754,989 B2 | 6/2004 | Eicher | |
| 6,767,159 B2 | 7/2004 | Jones | |
| 6,779,297 B2 | 8/2004 | Conde | |
| 6,931,798 B1 | 8/2005 | Pocai | |
| 6,938,369 B2 | 9/2005 | Zwier | |
| 6,944,998 B1 | 9/2005 | King | |
| 7,032,888 B1 | 4/2006 | Adair | |

(Continued)

OTHER PUBLICATIONS

Garden Edging, Paver Restraints, Specialty Edgings General Tips, Olyola.com, http://www.olyola.com/installroundtop.php printed on Feb. 24, 2014.

(Continued)

*Primary Examiner* — Michael P Ferguson

(57) ABSTRACT

Apparatuses and methods for connecting two segments of commercial landscape edging. Typically, landscape edging has a cylindrical portion that sits on or above the ground and a panel that inserts into the ground. A connector can be used to link together pieces of edging to form a continuous edge. In embodiments, a connector includes a body that can be inserted into the cylindrical portion of two pieces of landscape edging. The connector can include a ridge and a tab that extends from the body, such that when the body is inserted into the cylindrical portion of edging, the tab is adjacent to the panels of edging. One or more fasteners can be used to attach the edging panels to the tab of the connector, joining two pieces of edging via the connector.

12 Claims, 14 Drawing Sheets

(56) References Cited

U.S. PATENT DOCUMENTS

| | | | |
|---|---|---|---|
| 7,159,367 B1 | 1/2007 | King | |
| 7,195,421 B2 | 3/2007 | Dunbar | |
| 7,434,360 B2 | 10/2008 | Traub et al. | |
| D586,005 S * | 2/2009 | Schumaker et al. | D25/119 |
| 7,536,825 B2 | 5/2009 | Perotti | |
| 7,596,903 B1 | 10/2009 | Flanagan | |
| D606,670 S | 12/2009 | Keeley | |
| 7,669,365 B2 | 3/2010 | Olink | |
| 7,774,993 B2 | 8/2010 | Strobl, Jr. et al. | |
| 7,810,277 B2 | 10/2010 | Fakhari | |
| 7,854,424 B1 | 12/2010 | Cook et al. | |
| 7,900,395 B2 | 3/2011 | Leiter | |
| 7,908,792 B2 | 3/2011 | Heighton | |
| 7,963,718 B2 | 6/2011 | Zwier | |
| 8,056,195 B2 | 11/2011 | Zwier | |
| 8,127,490 B2 | 3/2012 | Perotti | |
| 2005/0210740 A1 | 9/2005 | Zwier | |
| 2008/0163566 A1 | 7/2008 | Bella | |
| 2009/0038214 A1 | 2/2009 | Rozen | |
| 2009/0064571 A1 | 3/2009 | Fakhari | |
| 2009/0199466 A1* | 8/2009 | Rosaen | 47/33 |
| 2009/0223121 A1 | 9/2009 | Jones | |
| 2010/0050505 A1 | 3/2010 | Zwier | |
| 2010/0058657 A1 | 3/2010 | Fishburn | |
| 2011/0277395 A1 | 11/2011 | Wink | |

OTHER PUBLICATIONS

90° Corner Connector, Valley View Industries, http://www.valleyviewind.com/consumers/lawn-edgings/accessories/90-degree-corner-connector/ printed on Feb. 24, 2014.

Cleanline XL Installation Instructions, Permaloc.com, http://www.permaloc.com/installation/cleanlinexlinstall.html printed on Feb. 24, 2014.

EdgePro Poly Landscape Edging, EdgePro Landscape Systems, http://www.edgepro.com/poly-edging.html printed Feb. 24, 2014.

Master mark Corner Coupler: http://hardwaredistributors.com/coupler-for-edging-90ang.html?gclid=Cl2-mMT50sMCFQaLaQod1oAA-A; printed on Feb. 8, 2014.

Patrician Edging Corner Connector-Pro: http://www.amazon.com/Patrician-Edging-Corner-Connector-Pro/dp/B000A0HH56/ref=sr_1_1?ie=UTF8&qid=1423420667&sr=8-1&keywords=patrician+edging+corner+connector; printed on Feb. 8, 2014.

* cited by examiner

US 9,043,960 B2

LANDSCAPE EDGING CONNECTOR

CROSS REFERENCE TO RELATED APPLICATIONS

This application claims priority from U.S. Provisional Application No. 61/737,398, the disclosure of which is hereby incorporated in its entirety by reference thereto.

TECHNICAL FIELD

The described apparatus and methods relate to the field of landscape edging, in particular to devices and methods for connecting individual pieces of edging material.

BACKGROUND

Landscape edging is commonly used in places such as yards and gardens to physically separate one area of land from another. It typically extends up to several inches both above and below the surface of the ground. The use of landscape edging provides both aesthetic and functional benefits. Aesthetically, the use of landscape edging produces a clean, organized look that is pleasing to the eye. Functionally, landscape edging serves to ensure that plants, mulch, and other material remain in the desired location. This not only organizes a yard, garden, or other area of land, but also reduces the time required to maintain the area.

Commercial landscape edging generally comes in discrete sections or strips of a set length. To edge an area that is larger than the length of a single section of edging, multiple sections must be joined together to form a continuous barrier. These sections are typically joined using special landscape edging connectors particularly adapted for this purpose.

BRIEF SUMMARY

The following presents a simplified summary in order to provide a basic understanding of some aspects of the claimed subject matter. This summary is not an extensive overview. It is not intended to either identify key or critical elements or to delineate the scope of the claimed subject matter. Its sole purpose is to present some concepts in a simplified form as a prelude to the more detailed description that is presented later.

The described apparatuses and methods relate to the field of landscape edging, in particular to devices and methods for connecting pieces of round-top style commercial landscape edging material. In embodiments, a connector used to join pieces of landscape edging includes a body shaped to insert into a cylindrical portion of the landscape edging, and a ridge connected to the body, such that when the body is inserted into the cylindrical portion of the landscape edging, the ridge is substantially flush with the cylindrical portion. The connector also includes a tab connected to the rib, such that when the body is inserted into the cylindrical portion of the landscape edging, the tab is adjacent to a panel of the landscape edging and is capable of being fastened to the panel to attach to the landscape edging.

In other embodiments, two pieces of landscape edging are connected by inserting a body of a connector into a cylindrical portion of the landscape edging, positioning a tab of the connector such that the tab is adjacent to a panel of the landscape edging, and fastening the tab of the connector to the panel of the landscape edging.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings

BRIEF DESCRIPTION OF THE DRAWINGS

The systems, devices and methods may be better understood by referring to the following description in conjunction with the accompanying drawings, in which like numerals indicate like structural elements and features in various figures. The components in the figures are not necessarily to scale, and simply illustrate the principles of the systems, devices and methods. The accompanying drawings illustrate only possible embodiments of the systems, devices and methods and are therefore not to be considered limiting in scope.

FIG. 6a depicts a piece of commercial landscape edging, as viewed edge-on.

FIG. 6b depicts an embodiment of a landscape edging connector with an offset tab, as viewed edge-on.

FIG. 6c depicts an embodiment of a landscape edging connector with an offset tab inserted into and placed substantially flush with a piece of commercial landscape edging, as viewed edge-on.

FIG. 6d depicts an embodiment of a landscape edging connector with a substantially centered tab, as viewed edge-on.

FIG. 6e depicts an embodiment of a landscape edging connector with a substantially centered tab joined with a piece of commercial landscape edging, as viewed edge-on.

DETAILED DESCRIPTION

Aspects of the system and methods are described below with reference to illustrative embodiments. The references to illustrative embodiments below are not made to limit the scope of the claimed subject matter. Instead, illustrative embodiments are used to aid in the description of various aspects of the systems and methods. The description, made by way of example and reference to illustrative reference is not meant to being limiting as regards any aspect of the claimed subject matter.

Devices and methods described in this application are particularly well adapted for use in joining segments of commercial landscape edging and will be described in that context. However, it will become apart that this description is illustrative of only one utility of the described devices and methods.

Current methods and devices for joining segments of round-top style commercial landscape edging suffer from multiple flaws. The typical process of joining two segments of edging together is dangerous, as pieces of the landscape edging segments must be cut away in order to allow the segments to overlap and be securely connected. This poses a significant risk to the individual installing the edging of sustaining cuts or other injuries. Additionally, this connection process can be both difficult and time consuming, as multiple steps are required to attach two segments of edging together. Finally, the existing methods of joining pieces of edging together are not secure and allow the pieces of edging to separate from one another over time. This requires continued maintenance and reinstallation of the landscape edging connections. Accordingly, there exists a long-felt but unaddressed need for improved apparatuses and methods for connecting commercial landscape edging that are safer, quicker to use, and more secure than the existing apparatuses and methods.

Figure 1:
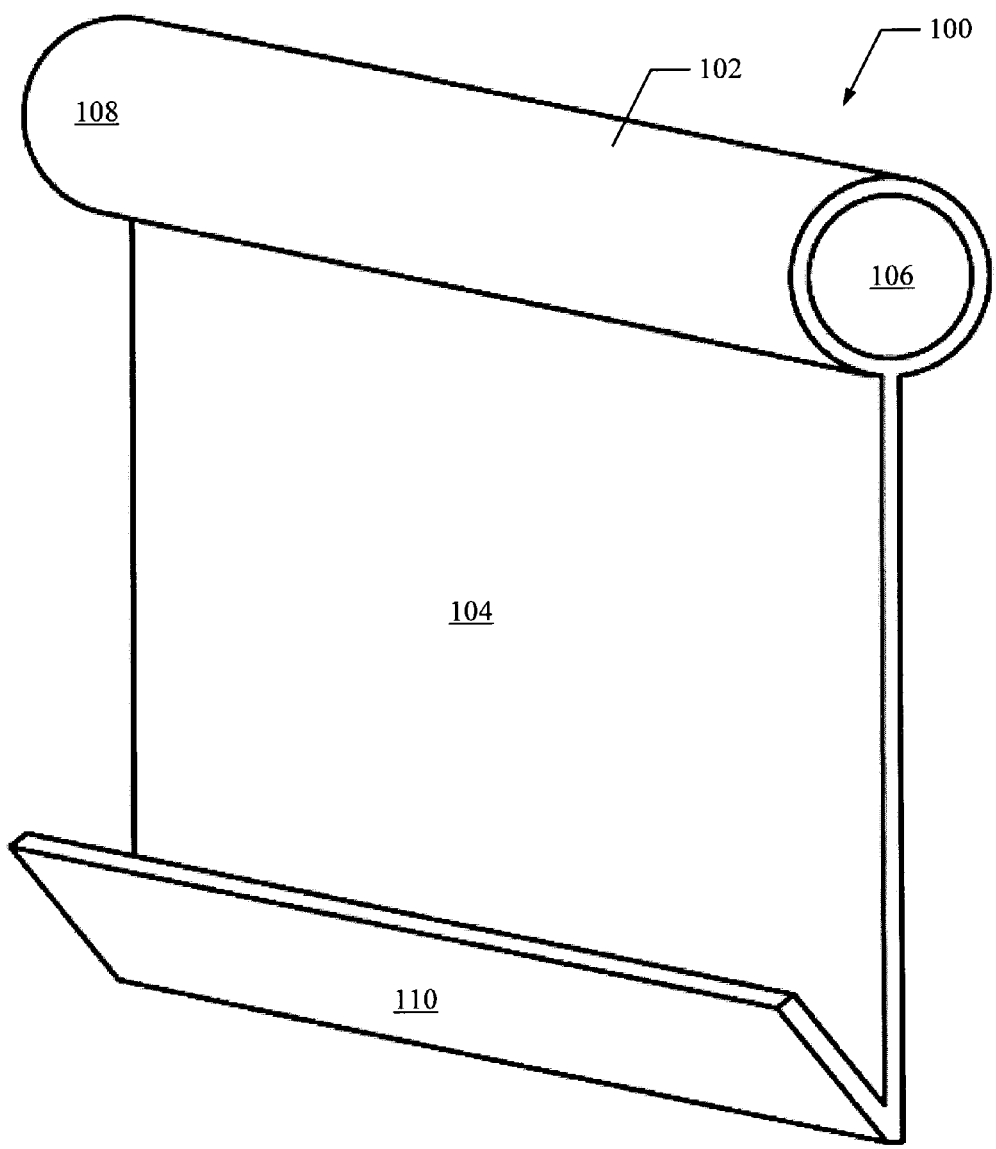
FIG. 1 depicts a piece of commercial landscape edging.

Referring to FIG. 1, a segment of round-top style commercial landscape edging 100 is generally comprised of a hollow cylindrical portion 102 and a panel 104. The cylindrical portion 102 is hollow, and has both an interior surface 106 and an exterior surface 108. The panel 104 terminates in an angled lip 110.

Typically, when commercial landscape edging 100 is installed, the cylindrical portion 102 remains above the ground. This provides visual appeal and serves to separate plants, soil, and other material on the surface. The panel 104 is inserted into the ground to hold the edging 100 in place and separate soil and other materials below the surface, such as roots. Along with the rest of the panel 104, the lip 110 at the terminal portion of the panel 104 is also inserted into the ground. The lip 110 helps hold the edging 100 in place in the ground.

A single segment of edging 100 is generally not long enough to fully edge an area of ground. Accordingly, segments of edging 100 are rarely used alone. If pieces of edging 100 are merely placed adjacent to each other, they will separate and shift over time. Expansion and contraction of the edging 100 and the ground due to temperatures changes will cause individual pieces of edging 100 to move. Landscape edging connectors can attach segments of edging 100 and hold them together. Multiple segments of edging 100 can be linked together to form any desired length of generally continuous edging 100.

Figure 2:
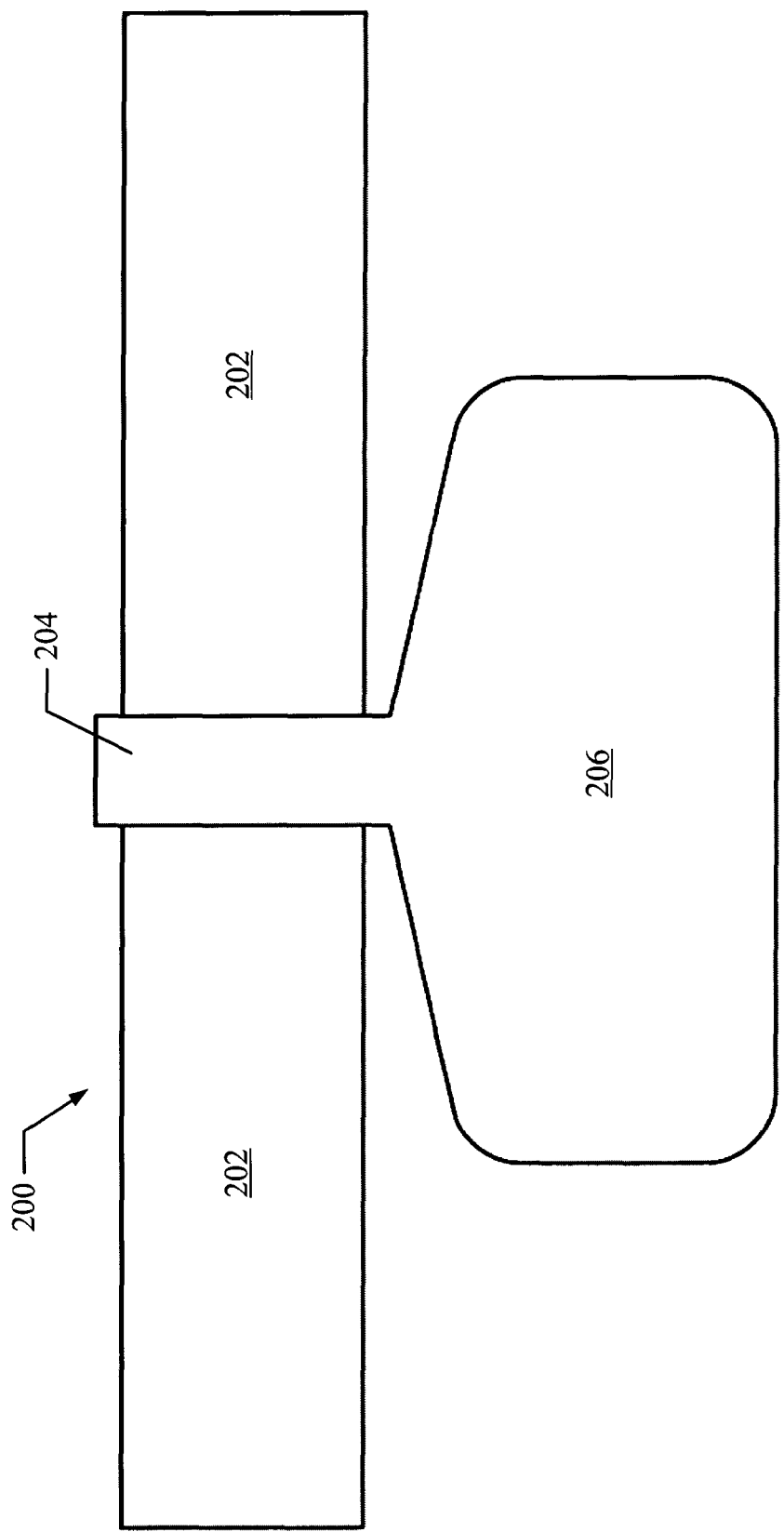
FIG. 2 depicts a side view of an embodiment of a landscape edging connector.

FIG. 2 depicts an embodiment of a landscape edging connector 200. The depicted embodiment of the connector 200 includes a body 202 and a tab 206, joined together via a ridge 204. The body 202 may be cylindrical or nearly cylindrical. In an embodiment, the outer diameter of the body 200 is less than the diameter of the interior surface 106 of commercial landscape edging 100. In other embodiments, the body 202 can be any shape suitable to be inserted into the cylindrical portion 102 of landscape edging 100. In the depicted embodiment, the diameter of the ridge 204 is equal to or greater than that of the body 202. In one embodiment, the diameter of the ridge 204 may be equal or substantially equal to the diameter of the exterior surface 108 of commercial landscape edging 100.

Figure 3:
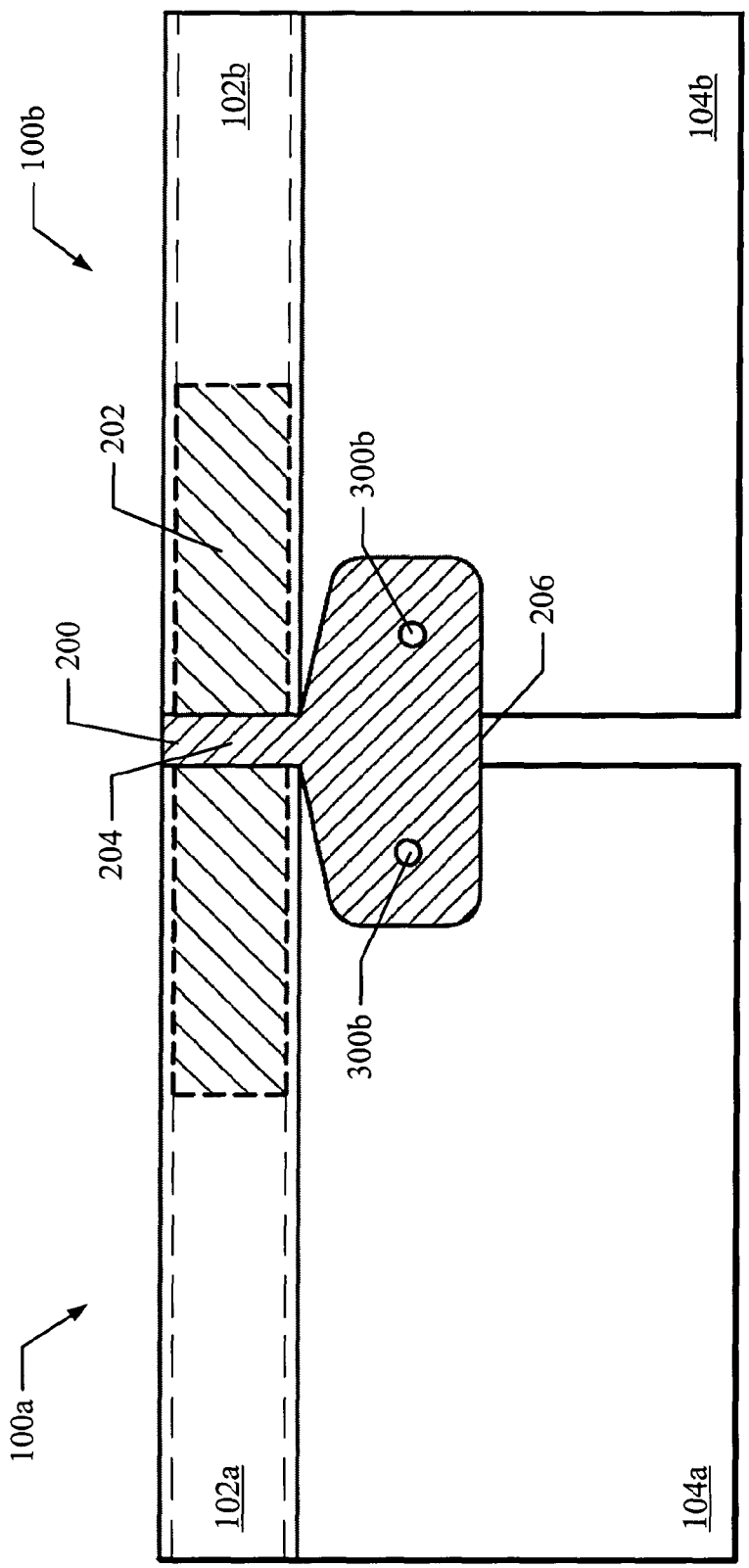
FIG. 3 depicts a side view of an embodiment of a landscape edging connector joining two pieces of commercial landscape edging.

With reference to FIG. 3, in one embodiment a single connector 200 is used to join two pieces of commercial edging 100a and 100b. The body 202 of the connector 200 is inserted into the hollow cylindrical portions 102 of each of the two pieces of edging 100a and 100b. In embodiments, the tab 206 of the connector 200 extends vertically away from the body 202 of the connector 200 but has a height less than or equal to that of panels 104 on two pieces of edging 100. The tab 206 extends laterally away from the ridge 204 so as to overlap with the panels 104a, 104b of the two pieces of edging 100a, 100b when the connector 200 is installed between two pieces of edging 100a, 100b. Although the total length of the tab 206 may be greater than or equal to the total length of the body 202, in the embodiment shown here, the tab 206 does not extend the full length of the body 202 of the connector 200.

The tab 206 can be affixed to the panels 104a, 104b of the two pieces of edging 100a, 100b using fasteners 300a, 300b. These fasteners 300a, 300b may be made of metal, plastic, or any other suitable material. The fasteners 300a, 300b can be nails, screws, brads, or any other suitable fasteners. In embodiments, the fasteners 300a, 300b can be formed as part of the tab 206. Alternatively, the fasteners 300a, 300b can be made separately from the tab 206. In an embodiment, these fasteners 300a, 300b puncture the tab 206 of the connector 200 and the panels 104a, 104b of the two respective pieces of commercial edging 100a, 100b. The fasteners 300a, 300b serve to hold the connector 200 securely to both of the pieces of landscape edging 100a, 100b. Accordingly, the pieces of landscape edging 100a, 100b are effectively joined together. As will be readily understood by one of skill in the art, although only two fasteners 300a, 300b are shown here, any number or configuration of fasteners 300 could be used.

As depicted in FIG. 3, when the connector 200 is joined with two pieces of edging 100a, 100b, the ridge 204 of the connector 200 is substantially the same dimensions as the exterior surfaces 108a, 108b of the two pieces of edging 100a, 100b. As a result, when connected via the connector 200, the two pieces of edging 100a, 100b and the connector 200 are substantially smooth, forming a generally continuous edge. This smooth edge is both aesthetically pleasing and functionally advantageous. A smooth edge is less likely to be caught or nicked by various gardening or yard maintenance tools. As a result, this smooth connection is less likely to be damaged over time.

Figure 4:
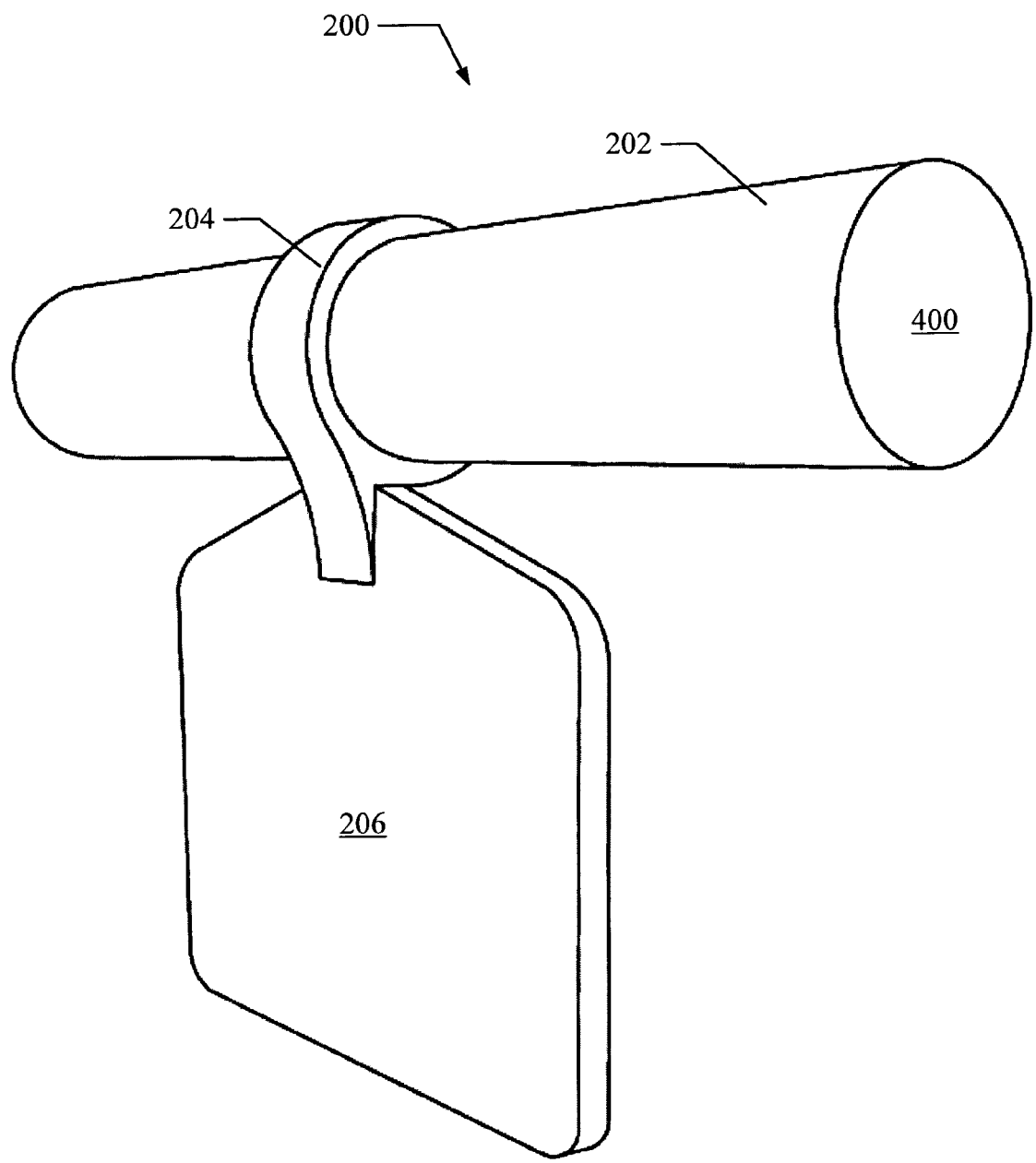
FIG. 4 is a perspective view depicting an embodiment of a landscape edging connector with a solid-body design.

Referring to FIG. 4, in an embodiment the cylindrical body 202 of the connector 200 may be solid. As such, in this embodiment, the body 202 has only an outer surface 400. The solid-body design uses more material than embodiments where the cylindrical body 202 is hollow, but may be simpler to manufacture or sturdier than other embodiments.

Figure 5:
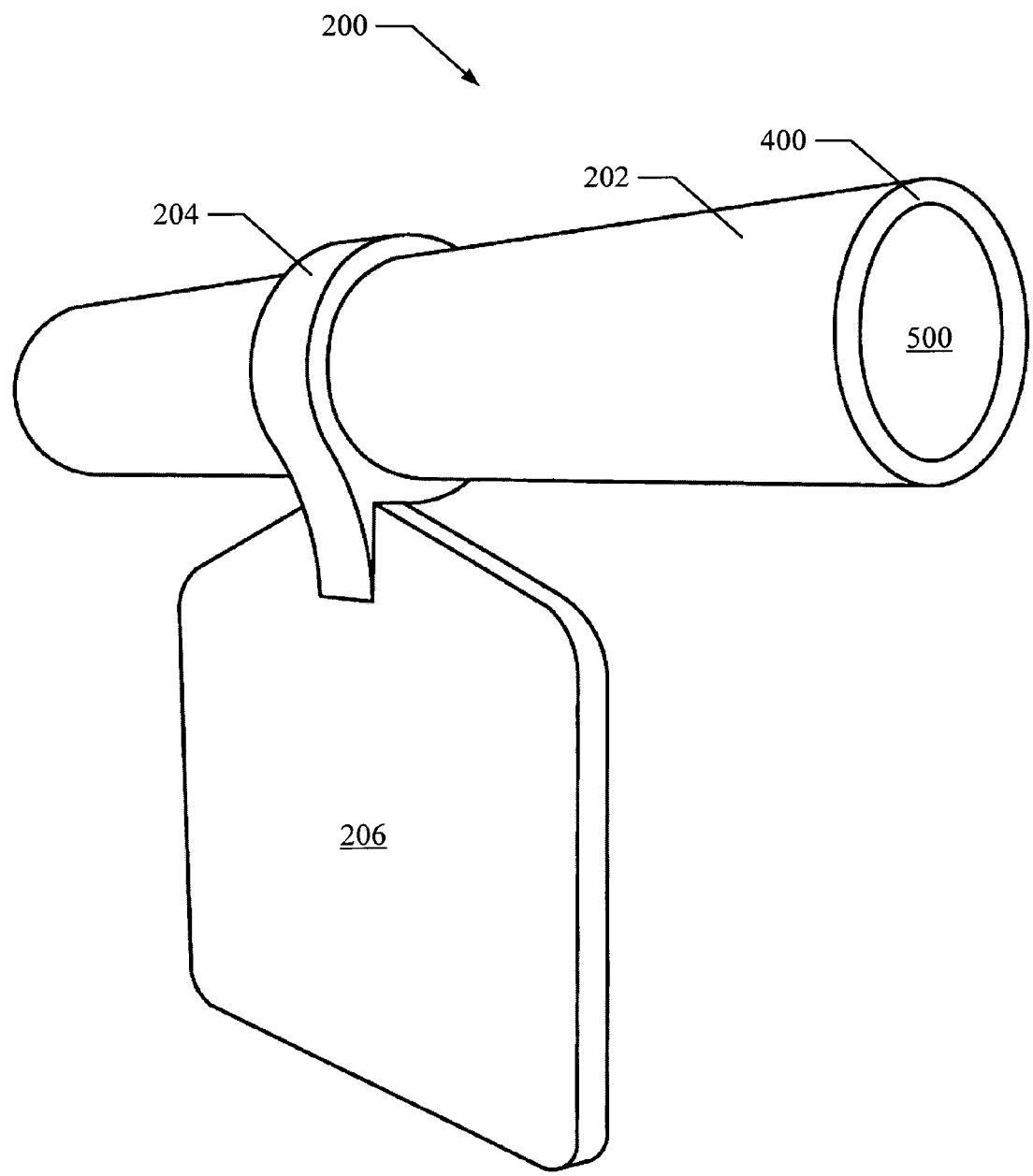
FIG. 5 is a perspective view of an embodiment of a landscape edging connector with a hollow-body design.

Referring to FIG. 5, in another embodiment the cylindrical body 202 of the connector 200 may be hollow. As such, in this embodiment, the body 202 has both an outer surface 400 and an inner surface 500. In contrast to the solid-body design described above, this hollow-body design reduces the amount of material required to form the connector 200, thereby generally reducing the cost to manufacture it. Additionally, this design is generally lighter weight and more flexible than solid-body designs.

Figure 6A:
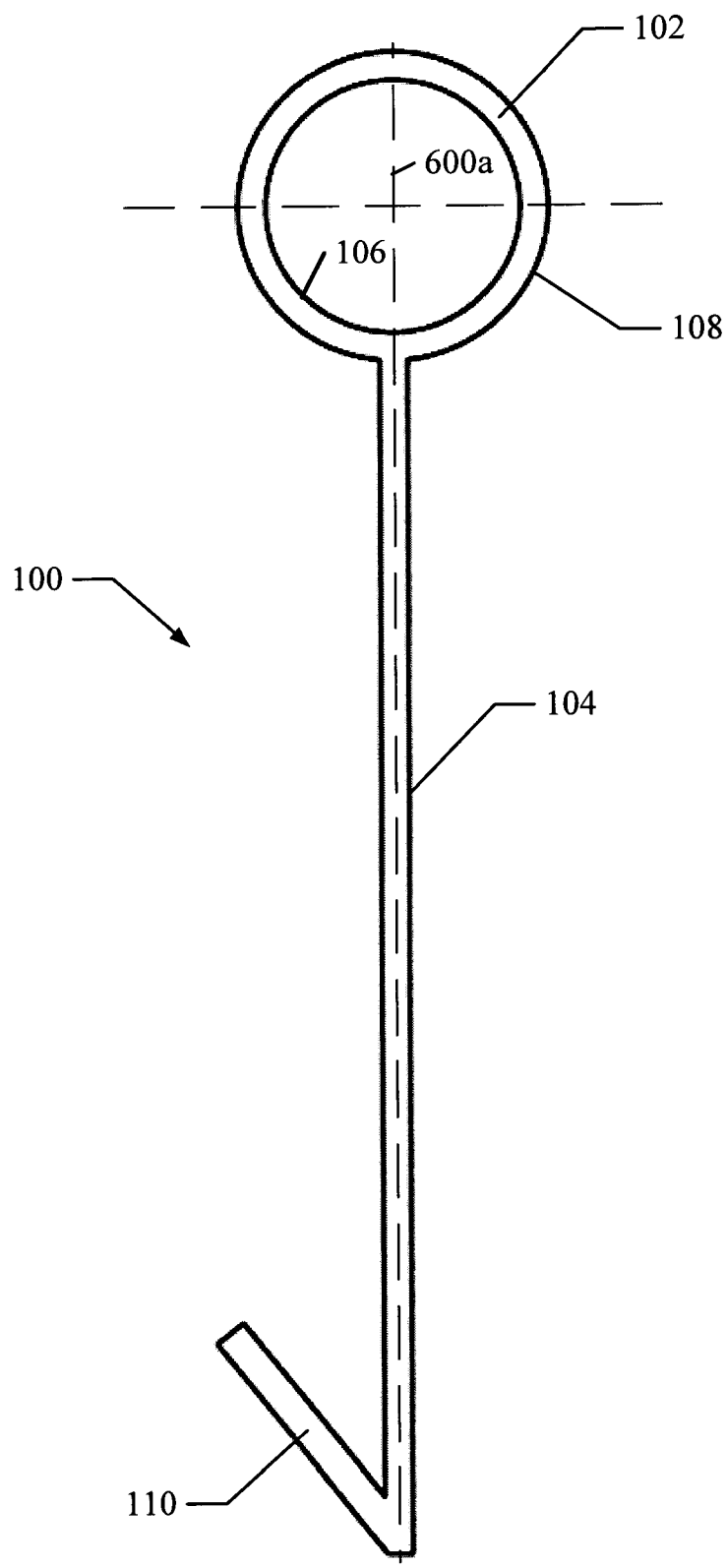
Figure 6B:
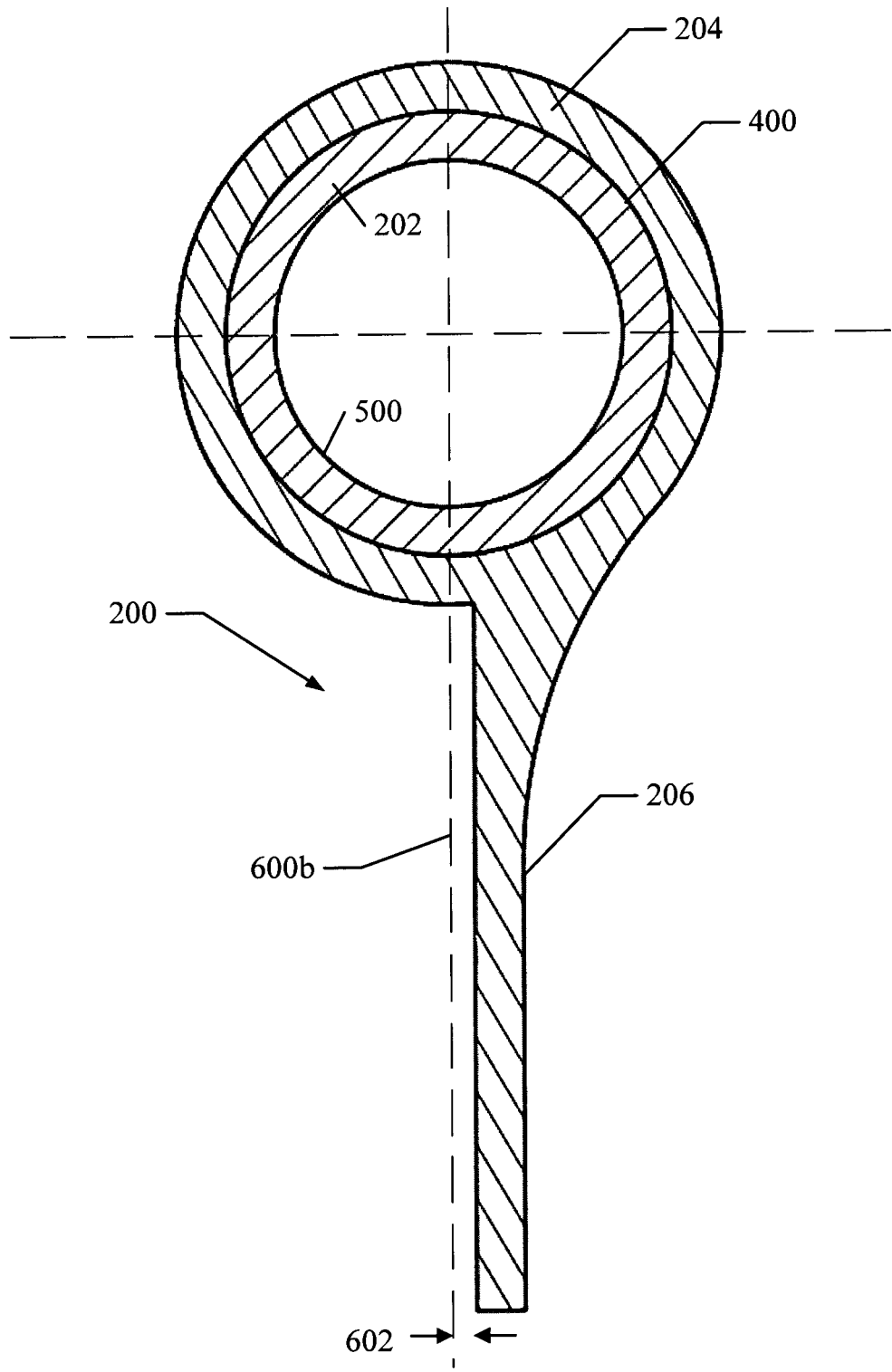
Figure 6C:
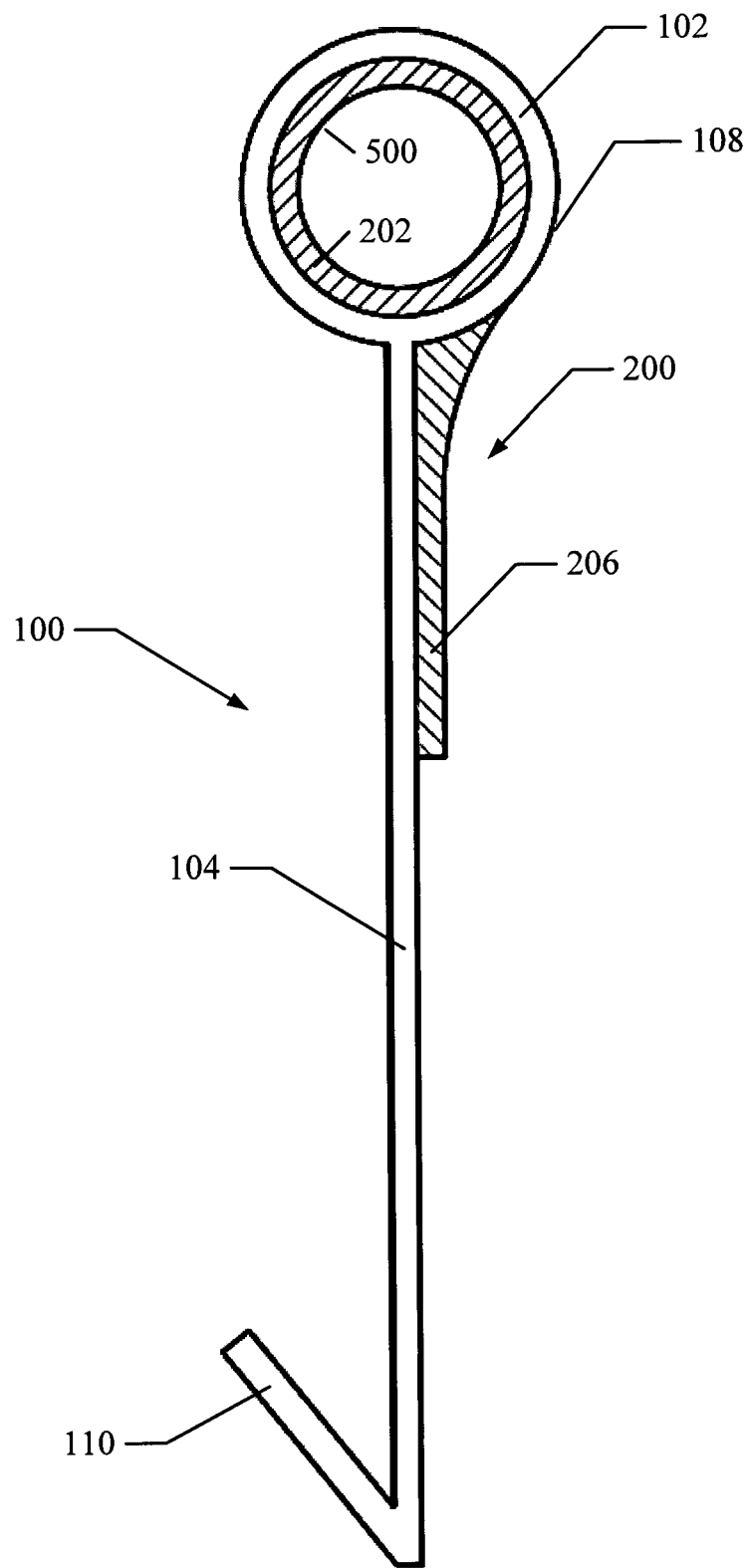

Referring now to FIGS. 6a through 6c, an embodiment of a connector 200 with an offset tab 206 is shown in relation with commercial edging 100. With reference to FIG. 6a, typical commercial landscape edging 100 is depicted, where the panel 104 of the commercial landscape edging 100 is substantially centered on the vertical axis 600a passing through the center of the cylindrical portion 102 of the edging 100. In contrast, with reference to FIG. 6b, in an embodiment of the connector 200, the tab 206 of a connector 200 having a hollow body 202 is substantially offset 602 from the vertical axis 600b passing through the center of the body 202 of the connector 200. As shown in FIG. 6c, this offset 602 allows the tab 206 to be seated flush against the panel 104 when the body 202 of the connector 200 is inserted into the cylindrical portion 102 of the edging 100. The tab 206 can thus be securely and snugly joined to the panel 104 using one or more fasteners 300.

Figure 6D:
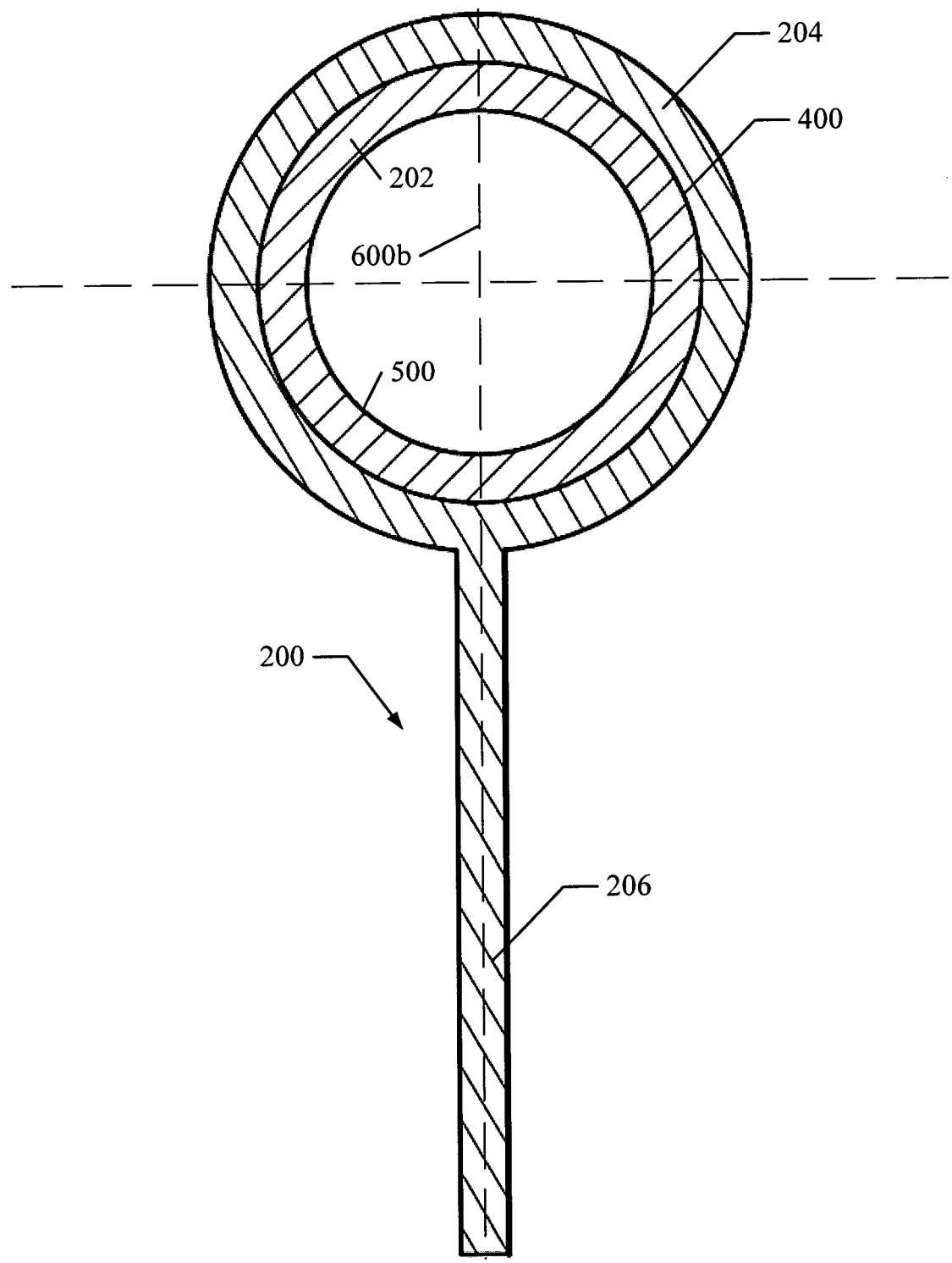
Figure 6E:
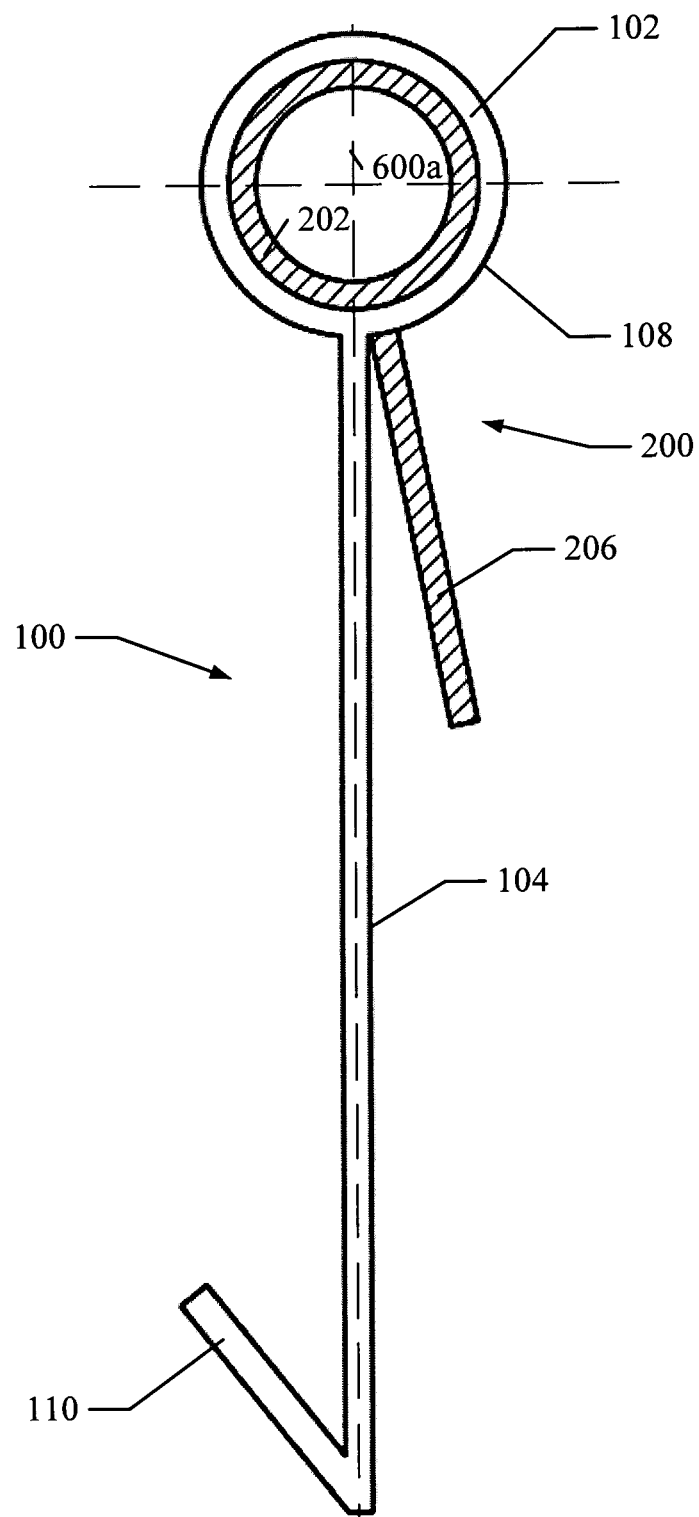

Referring now to FIGS. 6d and 6e, another embodiment of a connector 200 with a generally centered tab 206 is shown in relation to commercial edging 100. In the alternative embodiment shown in FIG. 6d, the tab 202 is not substantially offset from the vertical axis 600b passing through the center of body 202 of the connector 200. Instead, the tab 206 may be substantially centered on the vertical axis 600b. Accordingly, as shown in FIG. 6e, when the body 202 of the connector 200 is inserted into the cylindrical portion 102 of the edging 100, the tab 206 is not seated flush against the panel 104. However, the depicted angle between the tab 206 and the panel 104 is for illustration only and does not necessarily reflect the resulting angle or distance between the tab 206 and panel 104 in these embodiments.

Figure 7A:
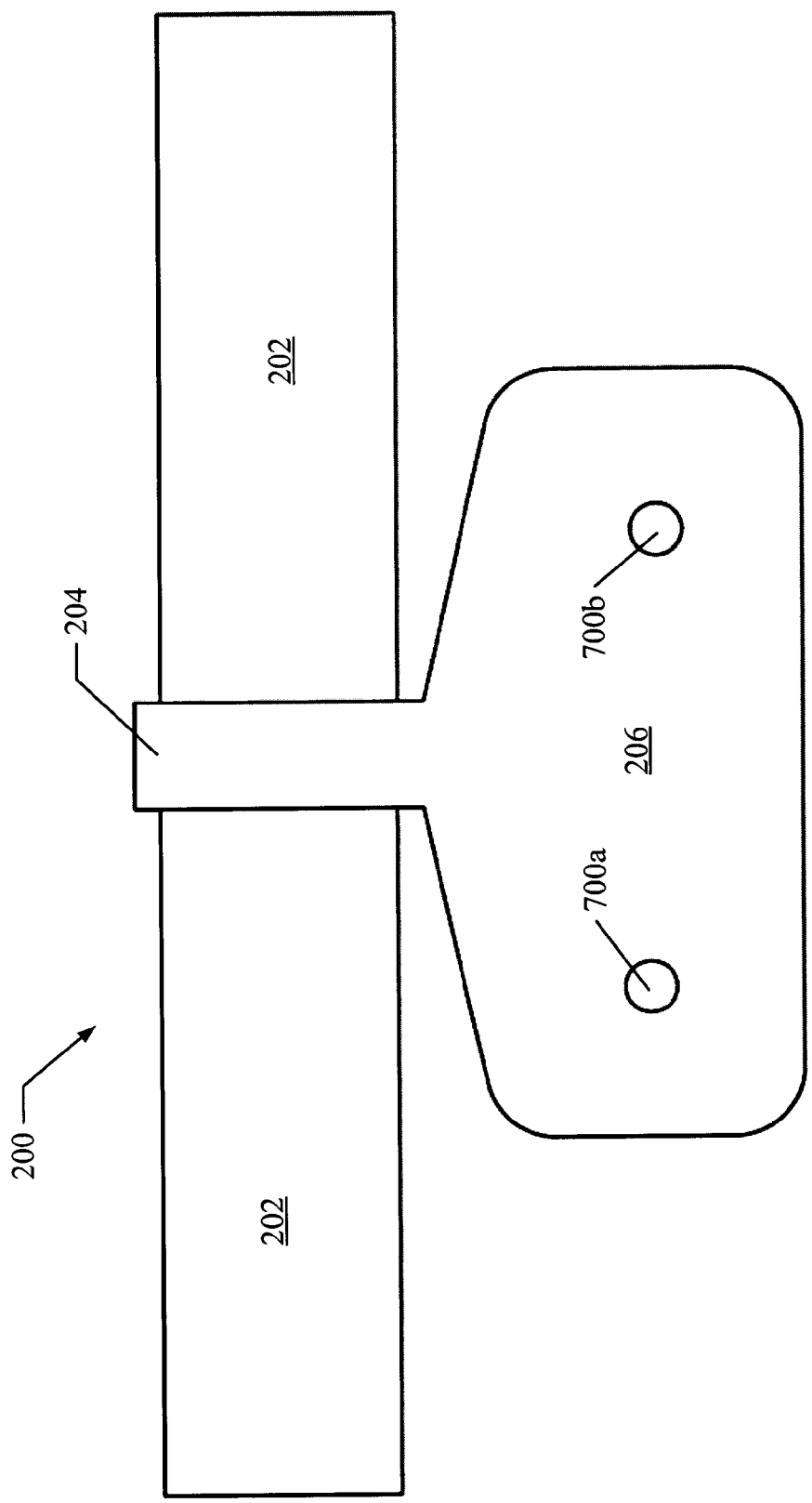
FIG. 7a depicts an embodiment of a landscape edging connector with two apertures.

Referring to FIG. 7a, in accordance with one embodiment, the tab 206 of the connector 200 may have two or more apertures 700a and 700b. These apertures 700a, 700b enable the tab 206 to more easily be connected to the panels 104a, 104b on two pieces of commercial edging 100a and 100b, respectively, thereby joining the two pieces of edging 100a and 100b together securely. For example, these apertures 700a, 700b may be used to more easily place fasteners 300a, 300b to connect the tab 206 to the panels 104a, 104b of edging 100a, 100b.

Figure 7B:
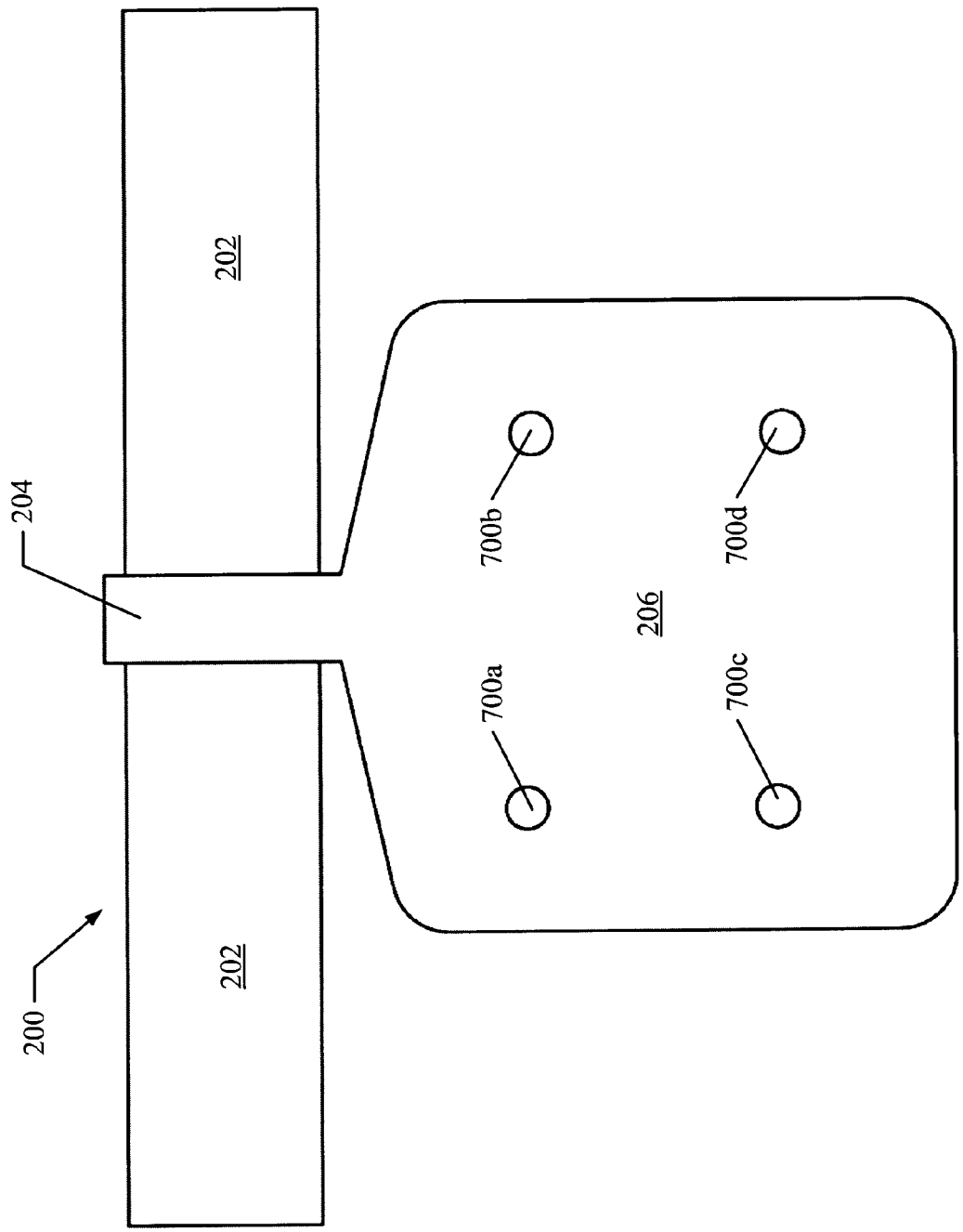
FIG. 7b depicts an embodiment of a landscape edging connector with four apertures.

Referring to FIG. 7b, in accordance with another embodiment, the tab 206 of the connector 200 may have any number of apertures 700a, 700b, 700c, 700d in any suitable configuration. As shown here, in one embodiment the tab 206 may have four apertures 700a, 700b, 700c, 700d. As will be understood by one of skill in the art, any number of apertures could be placed on the tab 206 of the connector 200 to facilitate a more secure connection between two pieces of commercial edging 100a, 100b. Generally, a fastener 300 will be used in each aperture 700.

Figure 8:
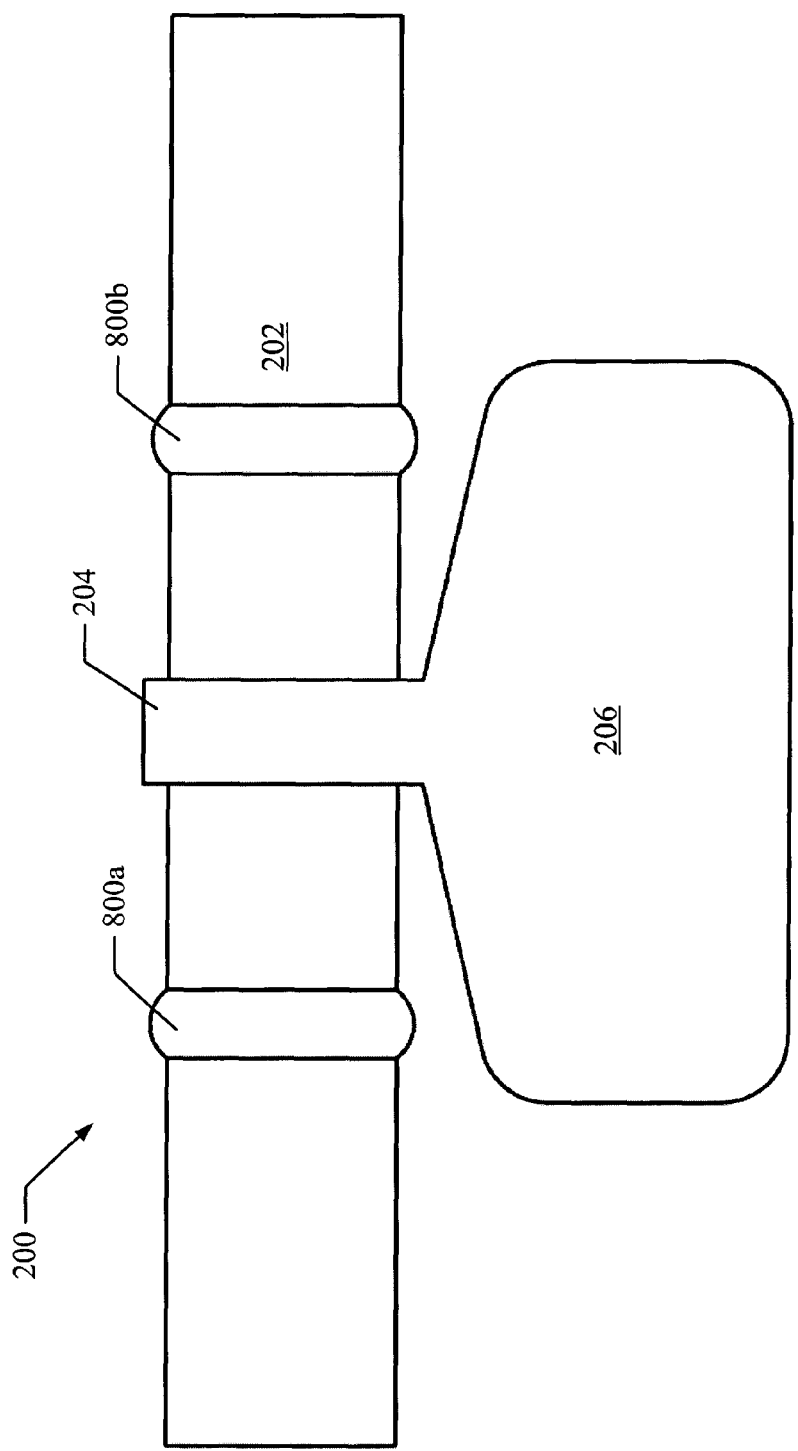
FIG. 8 depicts an embodiment of a landscape edging connector with ribs.

With reference to FIG. 8, in accordance with one embodiment the body 202 of the connector 200 can be formed with one or more ribs 800a, 800b. These ribs 800a, 800b are greater in diameter than the outer surface 400 of the body 202 of the connector 200. In one embodiment, the ribs 800a, 800b have a diameter approximately equivalent to the diameter of the interior surface 108 of commercial edging 100. Accordingly, the ribs 800a, 800b serve to increase the friction between the body 202 of the connector 200 and the cylindrical portions 102a, 102b of the two pieces of edging 100a, 100b, thereby facilitating a more secure connection. Alternatively, the ribs 800a, 800b may have a diameter greater or less than the diameter of the interior surface 108 of commercial edging 100. For example, the ribs 800a, 800b may be formed of a deformable material—such as rubber, a soft plastic, or another suitable material—such that they are compressed when the ribs 800a, 800b are inserted into the cylindrical portion 102a, 102b of the two pieces of edging 100a, 100b.

Although only a single rib 800a, 800b is shown on each side of the body 202 here, it will be understood by one of ordinary skill in the art that any number of ribs 800a, 800b could be used. Although the ribs 800a, 800b are depicted here as being rounded in profile, the ribs 800a, 800b could alternatively be triangular, rectangular, or have any number of other shapes. Additionally, other textures, such as bumps or waves, may be formed on the outer surface 208 of the body 202 of the connector 200 to similarly increase the friction between the body 202 and the interior surface 108 of round-top style commercial landscape edging 100. In an alternative embodiment, one or more ribs 800a, 800b may be located on only a single side of the body 202 of the connector 200.

Figure 9:
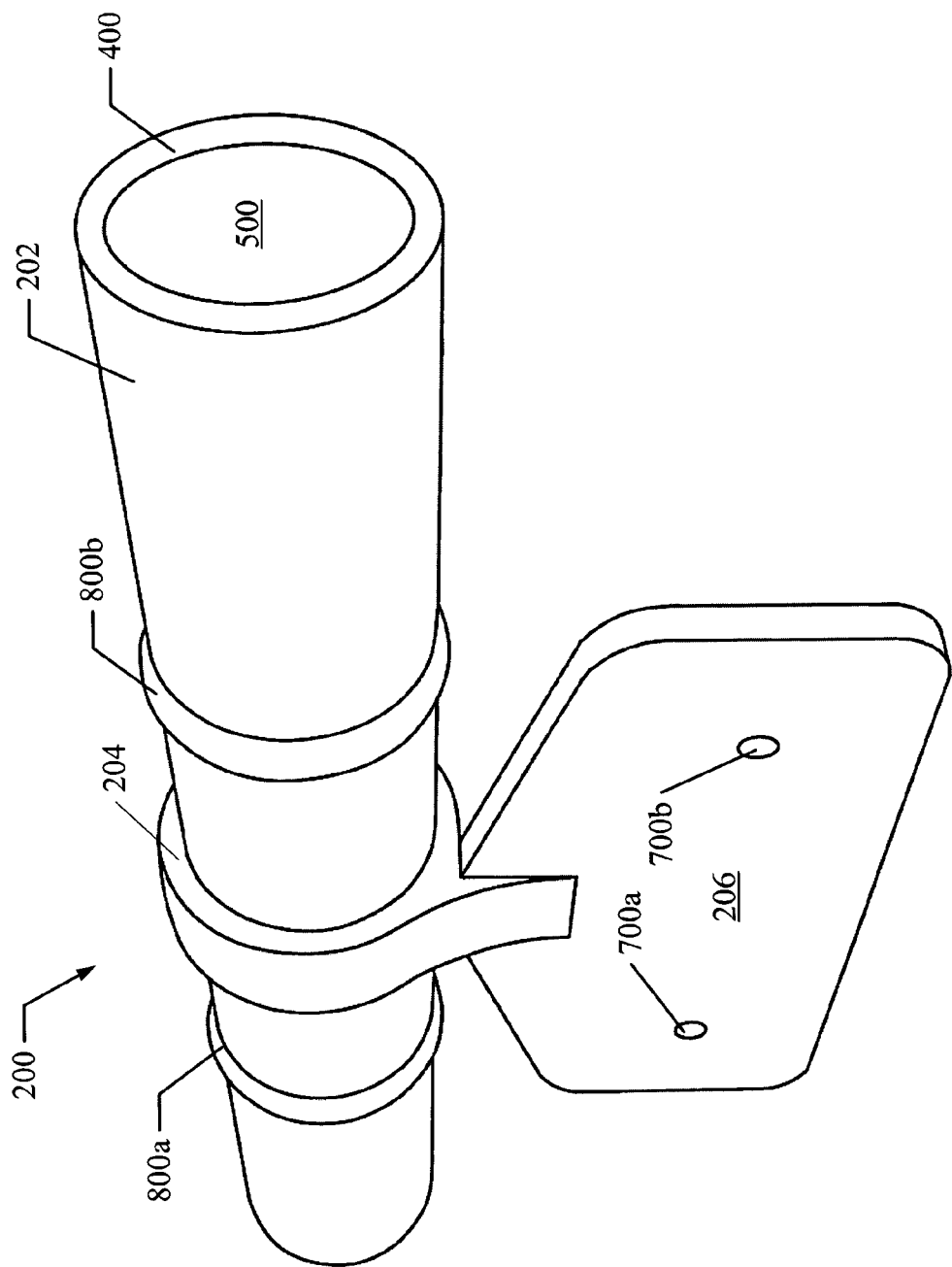
FIG. 9 depicts a perspective view of an embodiment of a landscape edging connector.

In FIG. 9, an embodiment comprising a hollow-body connector 200 with two apertures 700a, 700b and a single rib 800a, 800b on each side of the body 202 is shown. In this embodiment, the body 202 of the connector is about 5 and 3/16 inches wide and 1 and 3/16 inches tall. The rib 204 is approximately 3/8 of an inch wide and 1 inch tall. As such, when the body 202 of the connector 200 is inserted into commercial edging 100, the ridge 204 is the same height has the edging 100 and forms a flush surface. The tab 206 is generally 1 and 3/8 inches tall and 2 and 11/16 inches wide. Accordingly, there is about 1 and 3/8 inches between the bottom of the body 202 and the bottom of the tab and approximately 1 and 1/4 inch between both the left edge of the tab 206 and the left edge of the body 202 and the right edge of the tab 206 and the right edge of the body 202, respectively. The tab 206 is offset approximately 0.045 inches from the vertical axis 600b passing through the center of the body 202. As will be understood by one of skill in the art, other dimensions could be used with the connector 200. For example, the connector 200 could be made larger or smaller, depending on the size of the particular pieces of landscape edging 100 to which the connector 200 will attach.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. An apparatus that connects two adjacent pieces of landscape edging, comprising:
   an elongated body having a longitudinally-extending center axis that passes through a center of the body, wherein a first portion of the body longitudinally inserts into a first cylindrical portion of a first piece of landscape edging and a second portion of the body longitudinally inserts into a second cylindrical portion of a second piece of landscape edging;
   a ridge integrally-formed with and laterally projecting from the body, interposed between the first portion of the body and the second portion of the body; and
   a tab integrally-formed with the ridge, wherein the tab is parallel to and laterally offset a predetermined distance from the center axis, such that when the first portion of the body is inserted into the first cylindrical portion of the first piece of landscape edging and the second portion of the body is inserted into the second cylindrical portions of the second piece of landscape edging, the tab is positioned adjacent to both a first panel of the first piece of landscape edging and a second panel of the second piece of landscape edging in overlapping relation such that the tab is substantially flat against the first panel and the second panel without deformation of the tab and is fastened to both the first and second panels to join the first and second pieces of landscape edging.

2. The apparatus of claim 1, wherein the ridge forms a substantially contiguous surface with the first cylindrical portion and the second cylindrical portion when the first portion of the body is inserted into the first cylindrical portion and the second portion of the body is inserted into the second cylindrical portion of the landscape edging.

3. The apparatus of claim 1, wherein the predetermined distance is substantially equivalent to the distance between a central axis of the piece of landscape edging and an outer surface of the first panel.

4. The apparatus of claim 1, wherein the predetermined distance is approximately half of the width of the first panel.

5. The apparatus of claim 1, wherein the tab comprises at least one aperture.

6. The apparatus of claim 5, wherein at least one fastener is seated in the at least one aperture.

7. The apparatus of claim 1, wherein at least one fastener is formed as part of the tab.

8. The apparatus of claim 1, wherein the tab extends vertically from the ridge apart from the body, and extends laterally forming a gap between the tab and the body.

9. The apparatus of claim 8, wherein the body has a length and the extension of the tab is in a plane substantially parallel to the length of the body.

10. The apparatus of claim 1, wherein the tab is plate-shaped and extends vertically from the ridge away from the body, and extends horizontally, leaving an interstice between at least a portion of the tab and the body.

11. The apparatus of claim 1, wherein the offset is 0.0045 inches.

12. An apparatus that connects two adjacent pieces of landscape edging, comprising:
   an elongated body having a longitudinally-extending center axis that passes through a center of the body, the body having a first portion that longitudinally engages within a first cylindrical portion of a first piece of landscape edging and a second portion that longitudinally engages within a second cylindrical portion of a second piece of landscape edging;
   a ridge integrally-formed with and laterally projecting from the body and interposed between the first portion and the second portion; and
   a tab integrally-formed with the ridge substantially parallel to the center axis passing through the center of the body and laterally offset from the axis;
   wherein when the first portion of the body engages within the first cylindrical portion and the second portion of the body engages within the second cylindrical portion, the ridge is substantially flush with outer surfaces of the first cylindrical portion and the second cylindrical portion; and
   when the tab is positioned overlapping both a first panel of the first piece of landscape edging and a second panel of the second piece of landscape edging, the tab is substantially flat against the first panel and the second panel without deformation of the tab and the tab fastens to both the first panel and the second panel to join the first piece and the second piece of landscape edging.

* * * * *